(12) United States Patent
Gill

(10) Patent No.: US 10,837,513 B2
(45) Date of Patent: Nov. 17, 2020

(54) TELESCOPIC ARRANGEMENT

(71) Applicant: Gill Corporate Limited, New Milton (GB)

(72) Inventor: Michael John Gill, Hampshire (GB)

(73) Assignee: GILL CORPORATE LIMITED, New Milton (GB)

(*) Notice: Subject to any disclaimer, the term of this patent is extended or adjusted under 35 U.S.C. 154(b) by 26 days.

(21) Appl. No.: 16/306,287

(22) PCT Filed: Apr. 21, 2017

(86) PCT No.: PCT/EP2017/025097
§ 371 (c)(1),
(2) Date: Nov. 30, 2018

(87) PCT Pub. No.: WO2017/220207
PCT Pub. Date: Dec. 28, 2017

(65) Prior Publication Data
US 2019/0219123 A1    Jul. 18, 2019

(30) Foreign Application Priority Data
Jun. 24, 2016    (GB) .................................. 1611053.6

(51) Int. Cl.
*F16F 9/32* (2006.01)
*G01D 5/20* (2006.01)
(Continued)

(52) U.S. Cl.
CPC ............ *F16F 9/3292* (2013.01); *F16F 9/029* (2013.01); *F16F 9/0218* (2013.01); *F16F 9/38* (2013.01);
(Continued)

(58) Field of Classification Search
CPC ........ B60K 1/00; B60Y 2200/00; G01C 1/00; F16F 1/00; F16F 2222/00
See application file for complete search history.

(56) References Cited

U.S. PATENT DOCUMENTS

| 4,638,670 A | 1/1987 | Moser |
| 4,749,070 A * | 6/1988 | Moser .................. F16F 9/46 |
| | | 188/266.2 |

(Continued)

FOREIGN PATENT DOCUMENTS

| EP | 2821754 A2 | 1/2015 |
| WO | 2003030366 A2 | 4/2003 |
| WO | 2007137693 A2 | 12/2007 |

*Primary Examiner* — Jermele M Hollington
*Assistant Examiner* — Temilade S Rhodes-Vivour
(74) *Attorney, Agent, or Firm* — The Small Patent Law LLC; Jason P. Gross

(57) ABSTRACT

A telescopic arrangement (10) having a hollow cylinder (12) and a part (14) which is telescopically engaged with the cylinder. The arrangement is provided with at least one coil (22) constituting a first form of pulse-induction device, and at least one target (28) constituting a second form of pulse-induction device, to monitor the position of the said part (14) relative to the cylinder (12). A plurality of devices (22) each of one of the said first and second forms of device are positioned on the outside of the cylinder (12), at different respective positions therealong. At least one (28) of the other of the said first and second forms of device is fixed relative to the said part (14) of the arrangement (10) in a position such that it is moved over the said plurality of devices (22) in succession as the said part (14) is telescopically moved relative to the cylinder (12) of the arrangement (10).

14 Claims, 5 Drawing Sheets

(51) Int. Cl.
  *F16F 9/02* (2006.01)
  *F16F 9/38* (2006.01)

(52) U.S. Cl.
  CPC ........ *G01D 5/202* (2013.01); *F16F 2222/126* (2013.01); *F16F 2224/02* (2013.01); *F16F 2224/0208* (2013.01); *F16F 2230/0047* (2013.01); *F16F 2230/08* (2013.01); *F16F 2232/08* (2013.01)

(56) References Cited

U.S. PATENT DOCUMENTS

| | | | |
|---|---|---|---|
| 5,440,183 A * | 8/1995 | Denne | F15B 15/00 |
| | | | 310/12.26 |
| 5,712,563 A | 1/1998 | Kawagoe et al. | |
| 8,710,828 B1 * | 4/2014 | Meisel | G01D 5/2066 |
| | | | 324/207.17 |
| 2004/0169989 A1 * | 9/2004 | Babich | H02K 26/00 |
| | | | 361/160 |
| 2006/0073722 A1 * | 4/2006 | Allan | H01F 38/14 |
| | | | 439/246 |
| 2011/0089938 A1 * | 4/2011 | Schmidt | H03K 17/9525 |
| | | | 324/239 |

\* cited by examiner

TELESCOPIC ARRANGEMENT

RELATED APPLICATIONS

The present application is a National Stage of International Application No. PCT/EP2017/025097, filed on Apr. 21, 2017, and claims the benefit of United Kingdom Patent Application No. 1611053.6, filed on Jun. 24, 2016, each of which is incorporated by reference herein.

BACKGROUND

The present invention relates to a telescopic arrangement having a hollow cylinder and a part which is telescopically engaged with the cylinder, in which the cylinder is provided with pulse-induction coils to monitor the position of the said part relative to the cylinder.

Such a construction is described with reference to and is illustrated in FIG. 16 of EP 1121572 B. The whole contents of that patent specification are hereby imported into the present specification by direct reference. That earlier patent specification also explains the meaning of pulse-induction in this context. More especially, the present FIG. 1 shows electronic circuitry also illustrated and described in that prior patent specification, for generating an electrical pulse and applying it to a coil, and also subsequently measuring an electrical parameter in relation to the coil. The manner in which it operates is referred to herein as pulse induction or pulse-induction. More especially, the block circuit diagram shown in FIG. 1 shows circuitry used in conjunction with a coil 28. This comprises a system clock 30 connected to deliver electrical dock pulses to a pulse generator 32. This delivers a 80 μsec switching pulse to a switch 34 so that, during that time, the switch is closed and the voltage of about 5 volts is connected to one end of the coil 28, the other being earthed. Also connected across the coil are voltage measuring means 36 comprising a differential amplifier 38, a switch 40 and buffer amplifier 42 connected in series with one another with an output signal 44 being taken from the output of the buffer amplifier 42, the positive input to the differential amplifier being connected to the non-earthed end of the coil 28 and the negative input of the differential amplifier being connected to a point between two series connected resistors 46 and 48 constituting a feedback from the buffer amplifier 42 and connected to earth. The positive connection to the differential amplifier 38 is also connected to earth by a resistor 50.

A time delay 52 is also connected to the pulse generator 32, and a pulse generator 54 generating a pulse of approximately 3 μsec is connected to receive a signal from a delay 52 and cause the switch 40 to be closed for that pulse period.

Considering the operation of the circuitry shown in FIG. 1, the system clock 30 causes the pulse generator 32 to close the switch 34 for a period of approximately 80 μsec. This energizes the coil 28 for that period such that the voltage across the winding has a step function as shown in the graph in FIG. 2. When this pulse ends at time t0 in FIG. 2, the self-inductance of the coil 28 causes the voltage across it to fall sharply to a negative value of a magnitude well in excess of the 5 volts it had initially, whereafter at time t1 it starts to rise again and to reach zero value at about time t2 following an exponential curve C1 between time t1 and t2. However, with the presence of an electrically-conductive target near the coil, it follows the broken curve C2, in which the decay of a negative voltage across the coil 28 is slowed down so that the voltage does not come to zero value again until about time t3, well after time t2. Thus, the switch 40 receives the pulse which doses it for about 3 μsec, about 10 μsec after the coil 28 was de-energized (by which time the excitation energy has completely or almost completely died away, so that for the purposes of making the desired measurement, it has died away). This therefore provides a measure of the voltage across the coil 28 at time t4, about 20 μsec after time t0 and lasting for about a period of 3 μsec.

It will be appreciated that the specific components and values given in relation to the circuitry shown in FIG. 1 and the timings given in relation to FIG. 2 provide an example only of the construction and operation of pulse induction circuitry. Pulse-induction circuitry currently used would be in microchip form, possibly having an equivalent operation to the circuitry shown in FIG. 1, but possibly of a different construction or operation. What is common to the operation of all pulse-induction devices is that they all cause a pulse of electrical current to pass through a coil component which pulse ends abruptly, and subsequently measure the electrical current passing through the coil component, or the voltage across it, at a time when any electrical current through or voltage across the coil component would have died away in the absence of a target having electrically conductive material.

The earlier telescopic arrangement described in EP 1121572 B is a piston and cylinder arrangement which has coil portions extending from a base of the cylinder within its interior, and also within the interior of a hollow piston rod of the arrangement to a varying extent, depending upon the position of the piston relative to the cylinder. Such a construction is relatively inaccurate and is expensive to make.

The present invention seeks to provide a remedy.

SUMMARY OF EMBODIMENTS OF THE DISCLOSURE

In one or more embodiments, a telescopic arrangement is provided that has a hollow cylinder and a part which is telescopically engaged with the cylinder. The arrangement is provided with at least one coil constituting a first form of pulse-induction device, and at least one target constituting a second form of pulse-induction device, to monitor the position of the said part relative to the cylinder. A plurality of devices each of one of the first and second forms of device are positioned on the outside of the cylinder, at different respective positions therealong, and at least one of the other of the said first and second forms of device is fixed relative to the said part of the arrangement in a position such that it is moved over the said plurality of devices in succession as the said part is telescopically moved relative to the cylinder of the arrangement.

BRIEF DESCRIPTION OF THE DRAWINGS

An example of a telescopic arrangement made in accordance with the present invention will now be described in greater detail with reference to the accompanying drawings, in which.

DETAILED DESCRIPTION OF EMBODIMENTS OF THE DISCLOSURE

Figure 1:
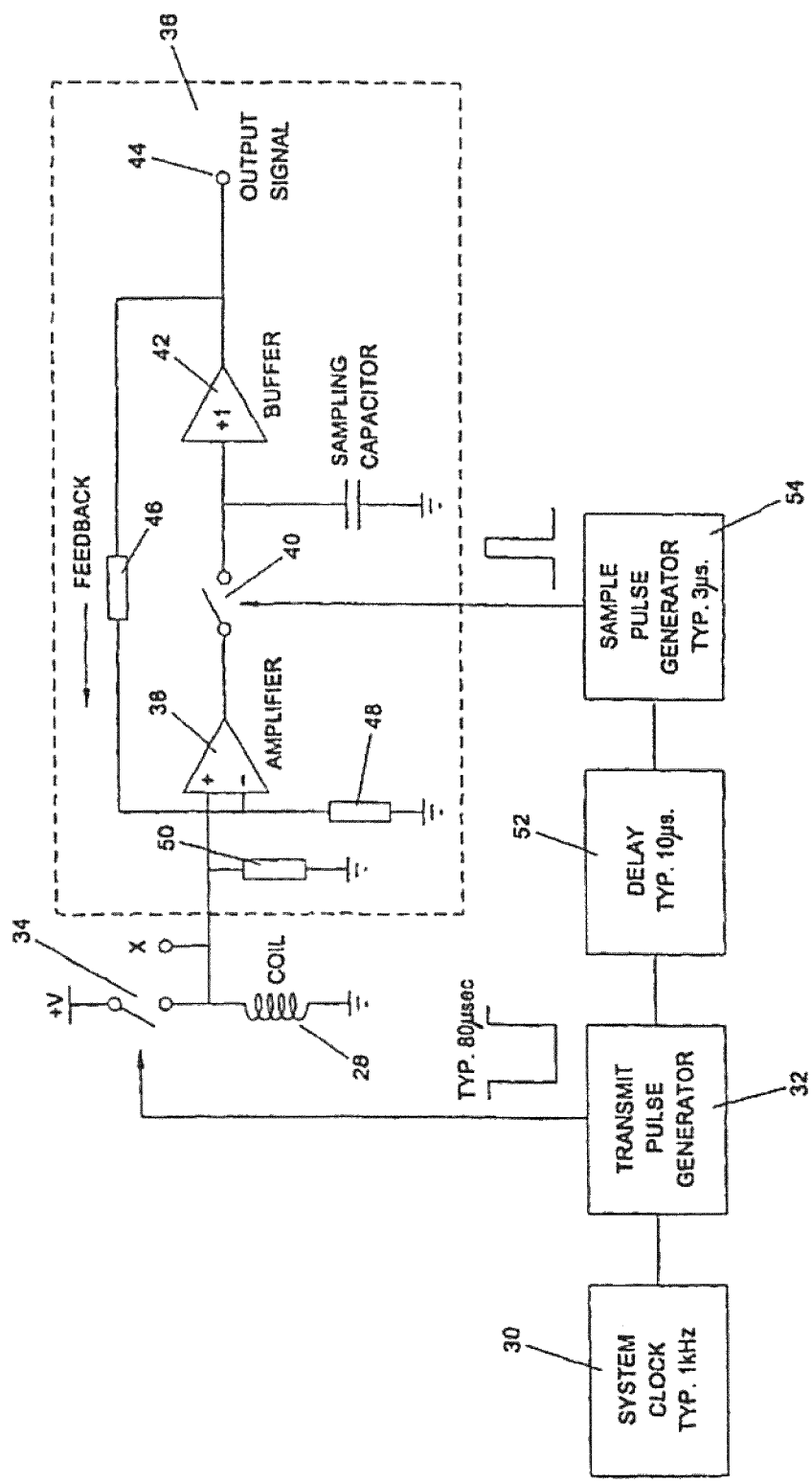
FIG. 1 shows electronic circuitry for generating an electrical pulse and applying it to a coil and also subsequently measuring an electrical parameter in relation to the coil.
Figure 2:
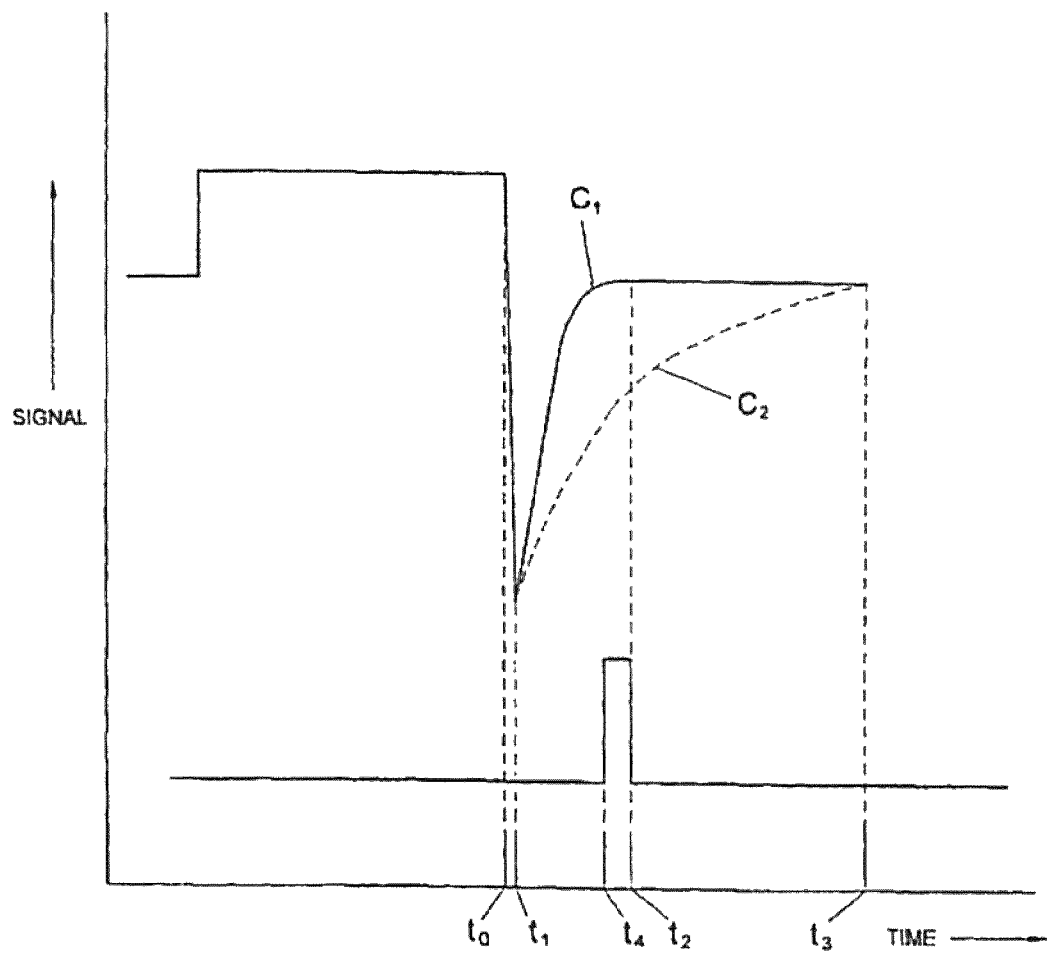
FIG. 2 illustrates timings in relation to an example of pulse induction circuitry.

Accordingly, the present invention is directed to a telescopic arrangement having a hollow cylinder and a part which is telescopically engaged with the cylinder, in which the arrangement is provided with at least one coil constituting a first form of pulse-induction device, and at least one target constituting a second form of pulse-induction device, to monitor the position of the said part relative to the cylinder, characterised in that a plurality of devices each of one of the said first and second forms of device are positioned on the outside of the cylinder, at different respective positions therealong, and at least one of the other of the said first and second forms of device is fixed relative to the said part of the arrangement in a position such that it is moved over the said plurality of devices in succession as the said part is telescopically moved relative to the cylinder of the arrangement.

This provides the advantages of an accurate and relatively inexpensive construction, It is preferable that the said plurality of devices are positioned linearly along the cylinder, with their centers lying on an imaginary line that is parallel to the axis of the cylinder, for simplicity of manufacture.

Preferably the said plurality of devices lay flat against the cylinder. This facilitates a compact construction for the arrangement.

The telescopic arrangement may be provided with a sleeve that is fixed relative to and surrounds a said part of the arrangement and within which extends the cylinder, or at least a portion of the cylinder, depending upon the position of the said part relative to the cylinder, the said at least one of the said other form of device being attached to the interior of the sleeve at the end thereof from which extends a portion of the cylinder.

This provides protection for the said part and cylinder from dirt as well as providing a firm support for the said at least one of the said other form of device.

In the event that the cylinder is made from steel or other electrically conductive material, a shield made of a material which is relatively electrically insulative (compared to copper) and which is magnetically permeable, for example an amorphous metal alloy, may be provided between the said plurality of devices and the cylinder. This inhibits interference from eddy currents that would otherwise be created in the cylinder when the arrangement is in use.

The sleeve may be made of a plastics material. In the event that the sleeve is made from steel or other electrically conductive material, a shield of electrically insulative magnetically permeable material, for example an amorphous metal alloy, may be provided between the sleeve and the said at least one of the said other form of device. This inhibits interference from eddy currents that would otherwise be created in the sleeve when the arrangement is in use.

The said one form of device may be a pulse-induction coil.

This provides a relatively simple construction.

Preferably the respective axes of the coils are transverse of the axis of the cylinder. This facilitates the telescopic construction.

Each coil may be electrically connected to an associated coil located laterally alongside it, each coil being wound with the opposite handedness to that of its associated coil. As a result, interference form stray electromagnetic radiation is inhibited, and each coil and its associated coil will be wholly covered, or wholly uncovered, or covered to the same extent by the target, regardless of the relative position of the said part relative to the cylinder. One manner in which each coil and its associated coil may be wound in this way is described and illustrated in our co-pending patent application number 1608207.5, the whole contents of which application are hereby imported into this present specification by direct reference. Thus the coils may be printed on respective circuit boards, for example as rectangular spirals.

In an alternative embodiment of the present invention, the said one form of device is a pulse-induction target, and there are a plurality of pulse-induction coils fixed relative to the said part of the arrangement, to provide a Nonius configuration as described in our co-pending European patent application number 14002097.5, the whole contents of which are hereby imported into this present specification by direct recitation.

The telescopic arrangement may be constituted by a piston and cylinder arrangement.

The piston and cylinder arrangement may be constituted by a shock absorber.

Figure 3:
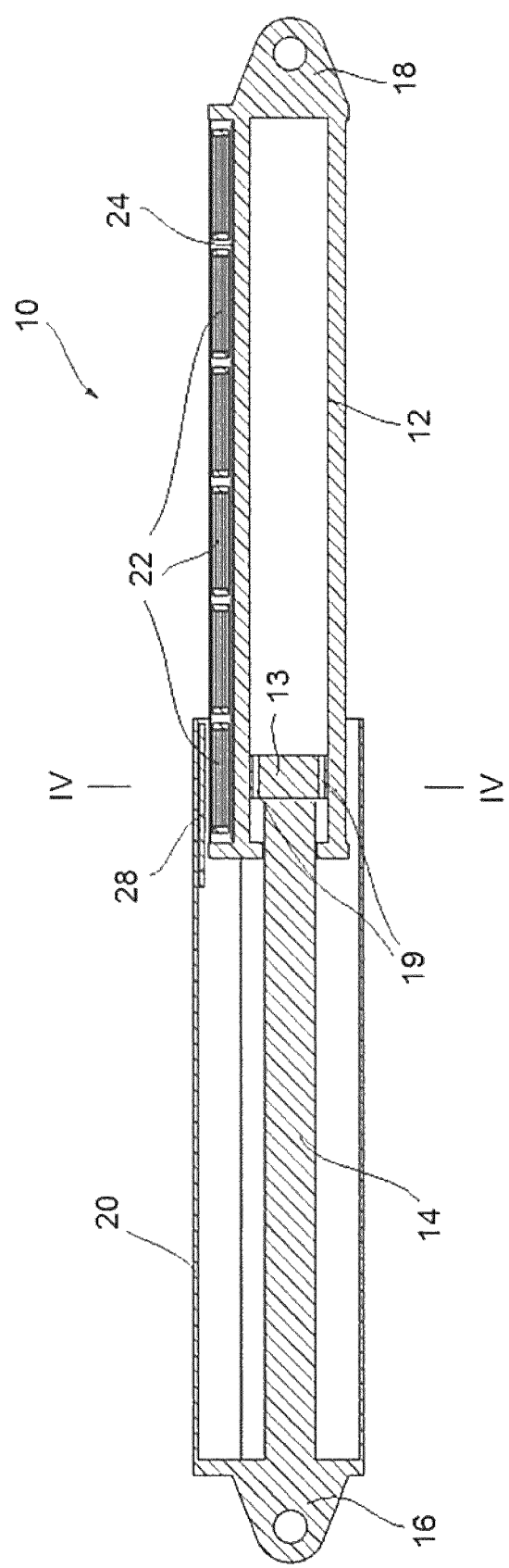
FIG. 3 shows a diagrammatic axial sectional view of a shock absorber embodying the present invention.
Figure 4:
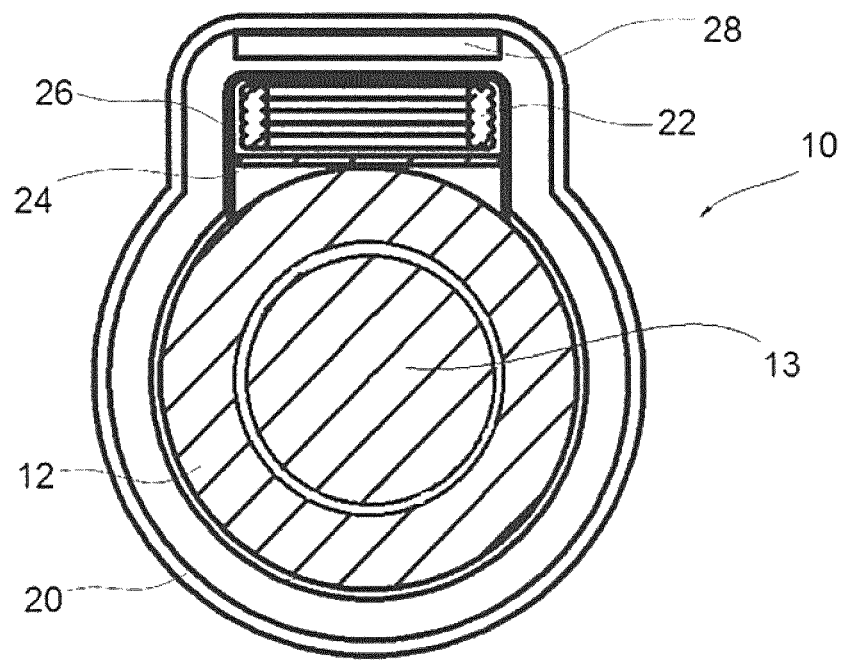
FIG. 4 shows a diagrammatic cross-sectional view of the shock absorber shown in FIG. 3 taken in the plane indicated by the line IV-IV in FIG. 3.
Figure 5:
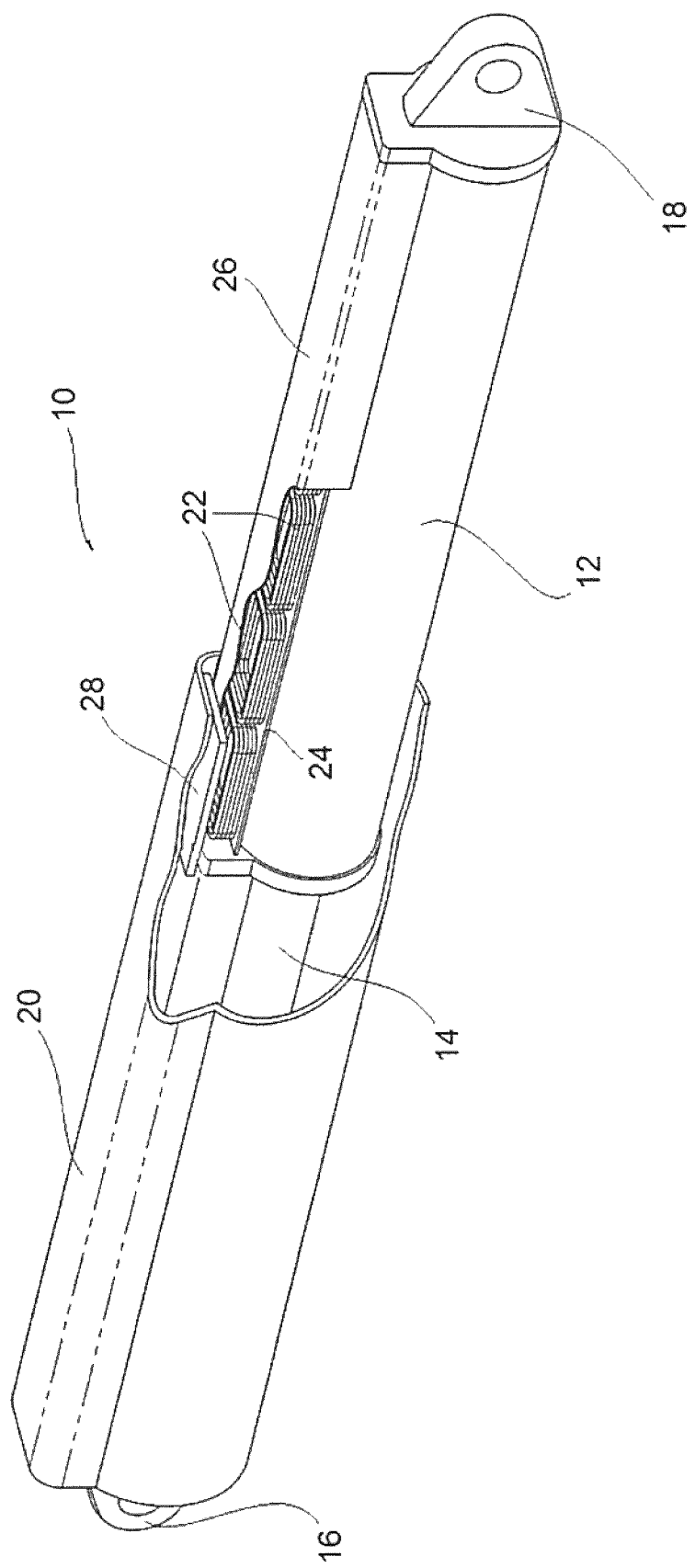
FIG. 5 is a perspective part cut-away view of the shock absorber shown in FIGS. 3 and 4.

The shock absorber 10 shown in FIGS. 3 to 5 comprises a hollow gas-filled steel cylinder 12 within which is located a steel piston 13 at the distal end of a steel piston rod 14. It will be appreciated therefore that the shock absorber constitutes a telescopic arrangement in which the rod 14 is telescopically slidable into and out of the cylinder 12 thereby to alter the overall length of the shock absorber 10. That end of the rod 14 which is further from the cylinder 12 is provided with a first anchor portion 16 of the shock absorber 10, and that end of the cylinder 12 which is further from the rod 14 is provided with a second anchor portion 18 of the shock absorber 10. Axially extending passageways 19 in the piston 13 facilitate flow of gas from one side thereof to the other within the cylinder 12.

A sleeve 20 made from a plastics material extends from the anchor portion 16 parallel with the rod 14 thereby to surround the latter, and at its opposite end receives a portion of the cylinder 12 which is nearer to the anchor portion 16. The extent to which the cylinder 12 extends within the sleeve 20 depends upon the extent to which the rod 14 extends within the cylinder 12 within the range of possible positions of the piston 13 within the cylinder 12 by a relative sliding movement between the cylinder 12 and the rod 14.

With the shock absorber 10 oriented as shown in FIGS. 3 to 5, an upper side of the cylinder 12 is provided with a series of rectangular or square pulse-induction coils 22 uniformly positioned and spaced along the length of the cylinder 12, with the respective centers of the coils lying on an imaginary line which is parallel to the axis of the cylinder. The coils 22 lie flat against the cylinder 12, with a layer of amorphous metal alloy 24 located between the coils 22 and the cylinder 12.

Six coils 22 are shown spaced apart along the length of the cylinder 12 in FIG. 3, but a different number could be used, and indeed any number from 3 to 10 would be especially useful.

The coils 22 are enclosed within a non-metallic or thin metallic cover 26 having an open rectangular cross-section.

As can be seen more clearly from FIGS. 4 and 5, the cross-section of the sleeve 20 surrounds and corresponds to the cross-section through the combination of the cylinder 12 and sleeve 20. At the end of the sleeve 20 further from the anchor portion 16, on the inside of the portion of the sleeve which is of open rectangular section, there is located a rectangular pulse-induction copper target or activator 28 arranged parallel to the coils 22. S The dimensions of the target or activator 28 in the axial direction of the shock absorber 10 is approximately 40¾ greater than that of each coil 22, and with the coils 22 being substantially adjacent to one another, the target or activator 28 will usually overlap two adjacent coils 22 or three, depending upon the position of the piston 13 relative to the cylinder 12, although in the position shown in FIGS. 3 and 5, it only overlaps one coil 22.

The coils 22 are connected to circuitry {not shown in FIGS. 3 to 5) equivalent to that shown in FIG. 1. Pulses are sent successively by the circuitry to successive coils 22, to enable the circuitry to discriminate between signals from the different coils 22 so that the strengths of the signals from all the coils 22 enables the circuitry to determine the position of the piston 13 within the cylinder 12, or the overall length of the shock absorber 10, It will be appreciated in this respect that the presence of the layer 24 provides a shield and enables the circuitry to measure a significant signal from a coil 22 from a much greater distance than if the shield were absent, because magnetic field lines cannot penetrate the amorphous metal, so that they are directed outwardly, and then up towards the target 28, effectively focusing the magnetic field towards the target.

When the shock absorber 10 is in use, its length continuously varies in accordance with the forces and impulses acting on the anchor portions 16 and 18, to vary the overall length of the shock absorber 10. During use, electrical pulses are continuously fed to the coils 22 by the circuitry (not shown in FIGS. 3 to 5) equivalent to that shown in FIG. 1, and the echo signals from the coils are continuously monitored in accordance with the principles of operation of pulse-induction as disclosed herein. The strength of the echo signal in the different coils 22 provides an indication of the position of the piston rod 14 relative to the cylinder 12 at any instant.

Numerous variations and modifications to the illustrated construction may occur to the reader without taking the resulting construction outside the scope of the present invention. For example, the sleeve 20 may be made of a metal, and a layer of amorphous metal alloy may be arranged between the target 26 and the sleeve 20, and extend further along the interior of the sleeve 20 all the way to the anchor portion 16, to reduce the effect of eddy currents within the sleeve 20 when the shock absorber is in use. The coils 22 may be replaced by pulse-induction targets, and the target 28 may be replaced by pulse-induction coils, and circuitry may be provided to enable measurements to be made on the basis of the Nonius principle. Each coil 22 may be electrically connected to an associated coil (not shown) located laterally alongside it, each coil 22 being wound with the opposite handedness to that of its associated coil (not shown). As a result, each coil 22 and its associated coil (net shown) will be wholly covered, or wholly uncovered, or covered to the same extent by the target or activator 28, regardless of the relative position of the piston 13 within the cylinder 12. The coils 22 may be formed by being printed on respective printed circuit boards, for example as rectangular spirals, rather than as illustrated in FIGS. 3 and 5. The target 28 may be made of a different electrically conductive metal from copper. If the cylinder 12 is filled with oil, the rod 1A may be of smaller cross section, a floating piston (not shown) may be provided within the cylinder 12 towards the end thereof closer to the anchor portion 18, and the region of the cylinder interior between that floating piston and the anchor portion 18 may be filled with compressible gas to accommodate different amounts of the rod 14 being located within the cylinder 12.

The invention claimed is:

1. A telescopic arrangement having a hollow cylinder and a part which is telescopically engaged with the cylinder, in which the arrangement is provided with at least one coil constituting a first form of pulse-induction device, and at least one target constituting a second form of pulse-induction device, to monitor the position of the said part relative to the cylinder, wherein a plurality of devices each of one of the first and second forms of device are positioned on the outside of the cylinder, at different respective positions therealong, and at least one of the other of the said first and second forms of device is fixed relative to the said part of the arrangement in a position such that it is moved over the said plurality of devices in succession as the said part is telescopically moved relative to the cylinder of the arrangement;
   wherein the telescopic arrangement is provided with a sleeve that is fixed relative to and surrounds the said part of the arrangement and within which extends the cylinder, or at least a portion of the cylinder, depending upon the position of the said part relative to the cylinder, the said at least one of the said other form of device being attached to the interior of the sleeve at the end thereof from which extends a portion of the cylinder.

2. A telescopic arrangement according to claim 1, wherein the said plurality of devices are positioned linearly along the cylinder, with their centers lying on an imaginary line that is parallel to the axis of the cylinder.

3. A telescopic arrangement according to claim 1, wherein the said plurality of devices lay flat against the cylinder.

4. A telescopic arrangement according to claim 1, wherein in that the sleeve is made of a plastics material.

5. A telescopic arrangement according to claim 1, wherein the sleeve is made from an electrically conductive material, and a shield of electrically insulative magnetically permeable material is provided between the sleeve and the said at least one of the said other form of device.

6. A telescopic arrangement according to claim 1, wherein the cylinder is made from an electrically conductive material and a shield made of a material which is relatively electrically insulative and which is magnetically permeable is provided between the said plurality of devices and the cylinder.

7. A telescopic arrangement according to claim 1, wherein the said one form of device is a pulse-induction coil.

8. A telescopic arrangement according to claim 7, wherein the respective axes of the pulse-induction coils are transverse of the axis of the cylinder.

9. A telescopic arrangement according to claim 8, wherein each coil is electrically connected to an associated coil located laterally alongside it, each coil being wound with the opposite handedness to that of its associated coil.

10. A telescopic arrangement according to claim 7 wherein the pulse-induction coils are printed on respective circuit boards.

11. A telescopic arrangement according to claim 10, wherein the pulse-induction coils are printed on respective circuit boards as respective rectangular spirals.

12. A telescopic arrangement according to claim 1 wherein the said one form of device is a pulse-induction target, and there are a plurality of pulse-induction coils fixed relative to the said part of the arrangement, to provide a Nonius configuration.

13. A telescopic arrangement according to claim 1, wherein the telescopic arrangement is constituted by a piston and cylinder arrangement.

14. A shock absorber comprising a piston and cylinder arrangement as claimed in claim 13.

* * * * *